United States Patent
Vendt et al.

(10) Patent No.: US 6,230,979 B1
(45) Date of Patent: May 15, 2001

(54) CONTROLLER FOR TWO-STAGE HEAT SOURCE, USABLE WITH SINGLE AND TWO STAGE THERMOSTATS

(75) Inventors: Stephen J. Vendt; William P. Butler; David M. Cenedella, all of St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/488,490

(22) Filed: Jan. 20, 2000

(51) Int. Cl.[7] .............................. F28F 13/00; G05D 23/00
(52) U.S. Cl. .............................. 236/11; 236/1 E; 236/94; 165/262; 62/175
(58) Field of Search ..................... 236/11, 1 EA, 236/1 E, 10, 94; 165/256, 260, 262; 62/175

(56) References Cited

U.S. PATENT DOCUMENTS 5,022,460 * 6/1991 Brown ............................ 236/51 X
5,271,556 * 12/1993 Helt et al. ........................ 236/11
5,806,760 * 9/1998 Maiello ........................... 236/11

* cited by examiner

Primary Examiner—William Wayner
(74) Attorney, Agent, or Firm—Harness, Dickey & Pierce

(57) ABSTRACT

A controller for a two-stage heat source that can be used with a single stage or a two stage thermostat. The controller includes a second stage delay timer that initiates second stage heating when the timer is decremented to zero. The timer is reset when there is no longer a call for first stage heat, when there is a call for second stage heat, or if there is no call for second stage heat and the controller determines that it is connected to a two-stage thermostat. The controller can include an indicator such as a contact bar and jumper or a switch for indicating the type of thermostat connected to the controller. Alternatively, the controller can be programmed to "learn" whether it is attached to a single stage or two-stage thermostat, assuming that it is connected to a single stage thermostat, unless and until a call for second stage heating is received.

13 Claims, 3 Drawing Sheets

CONTROLLER FOR TWO-STAGE HEAT SOURCE, USABLE WITH SINGLE AND TWO STAGE THERMOSTATS

BACKGROUND OF THE INVENTION

This invention relates to a controller for a two-stage heat source that can be used with either a single or a two-stage thermostat.

There are two types of commonly available, gas-fired, warm air furnaces in the marketplace: those with a single gas flow rate, and those with two or more gas flow rates. These are referred to as single and multistage furnaces, respectively. Multistage furnaces are frequently selected by homeowners for replacement furnaces because they offer increased performance and comfort. In retrofit applications there is typically a thermostat and wiring in place. It can be troublesome to install a multistage thermostat in a retrofit application with a single stage thermostat already in place because of the need to add additional wiring. For simple and economical installation, it is desirable to be able to continue to use a single stage thermostat and single stage thermostat wiring with a replacement multistage furnace.

Several attempts have been made to utilize a single stage thermostat with two-stage furnaces. One method, disclosed in U.S. Pat. No. 5,271,556, ties the first stage and second stage terminals on the controller together. The controller recognizes a simultaneous call for first stage and second stage heat as a single stage thermostat, and operates in the first stage only. If the demand for heat is not satisfied within a predetermined time (typically ten minutes), the controller switches to second stage heating. Another method, disclosed in U.S. Pat. No. 5,806,760, includes a time delay relay in the first stage terminal. After the expiration of the time for the time-delay relay, the controller switches to the second stage heating.

SUMMARY OF THE INVENTION

The controller of the present invention permits a multi-stage heating plant, such as a two stage gas furnace, to be operated with either a single or a multi stage thermostat. This allows fast, easy, and inexpensive replacement of an existing single stage heating plant with a modern multistage heating plant, without replacing the thermostat and/or adding additional thermostat wiring.

Generally the controller of the present invention has a first terminal for connection to a single stage thermostat, or the first stage of a multistage thermostat, and a second terminal for connection to the second stage of a multistage thermostat. The controller also comprises an indicator for selecting the type of thermostat (single stage or multistage) that is connected to the controller. This indicator can be, for example, a contact bar with three contacts that are appropriately connected by the installer to indicate to the controller the type of thermostat connected to the controller. Alternatively, the controller could be programmed to assume that the thermostat is a single stage thermostat, unless and until the thermostat receives a demand for second stage heating which indicates that the controller is connected to a multistage thermostat.

The controller initiates a second stage delay timer, and the timer continues to count down unless reset, until it reaches zero and second stage heating is initiated. The second stage delay timer can be reset by several events, including the satisfaction of the demand for first stage heat; a demand for second stage heat; or the absence of a demand for second stage heat when the controller is connected to a multistage thermostat.

BRIEF DESCRIPTION OF THE DRAWINGS

Corresponding reference numerals indicate corresponding parts throughout the several views of the drawings.

DETAILED DESCRIPTION OF THE INVENTION

Figure 1A:
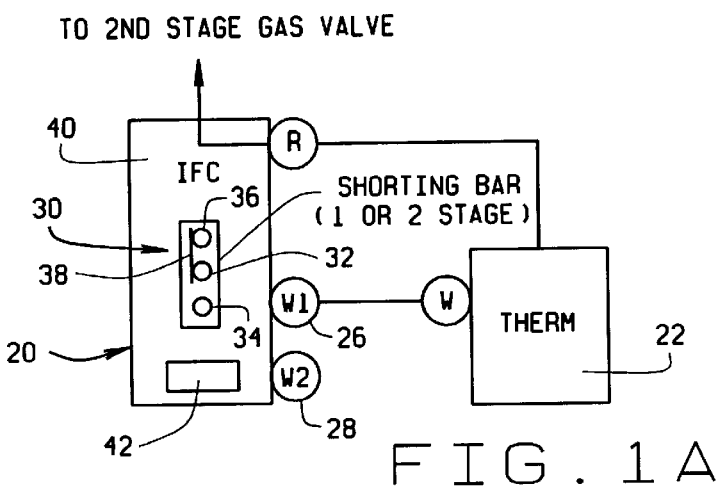
FIG. 1A is schematic view of a controller constructed according to the principles of the present invention, shown as it would be connected to a single stage thermostat.
Figure 2A:
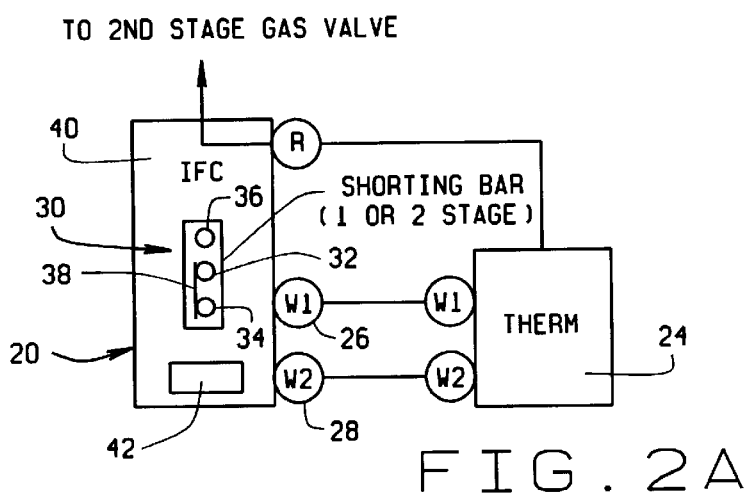
FIG. 2A is a schematic view of a controller constructed according to the principles of this present invention, shown as it would be connected to a multistage thermostat.

The present invention relates to a controller for a multi-stage heater, such as a multistage gas furnace, that can be used with either a single stage thermostat, or a multistage thermostat Such a controller is indicated generally as 20 in FIGS. 1A and 2A, where the controller is shown connected to a single stage thermostat 22 (FIG. 1A) and a two-stage thermostat 24 (FIG. 2A).

As shown in FIGS. 1A and 2A, the controller 20 includes first and second terminals 26 and 28. The first terminal 26 is adapted to be connected to the output of single stage thermostat 22 or the first stage output of multistage thermostat 24. The second terminal 28 is adapted to be connected to the second stage output of multistage thermostat 24. When used with single stage thermostat 22, the second terminal 28 of the controller 20 is not connected to the thermostat.

The controller 20 preferably also includes an indication device with which the installer can indicate the type of thermostat (single stageor multistage) that is connected to the controller. In the first preferred embodiment, this indication device is a contact block 30 with first, second and third contacts 32, 34, and 36. When the controller 20 is connected to single stage thermostat 22, a jumper 38 connects the first contact 32 and the third contact 36, and when the controller is connected to a multistage thermostat 24, jumper 38 connects the first contact 32 and the second contact 34.

In an alternate embodiment, the contact block 30 is replaced with a two position switch (not shown) with a first position for indicating that the controller 20 is connected to a single stage thermostat 22, and a second position for indicating that the controller is connected to a multistage thermostat 24. In still another alternate embodiment, the microprocessor 40 of the controller 20 is connected to the second terminal 28. The processor 40 assumes that the controller 20 is connected to single stage thermostat unless it receives a request for second stage heat on the second terminal 28, which can only happen if the controller is connected to a multistage thermostat 24.

The controller 20 also includes a second stage delay timer 42, typically set for ten minutes. Ten minutes is an appropriate compromise delay for determining whether first stage heating will be sufficient to satisfy the call for heat, without causing undue discomfort. Once initiated, the second stage delay timer counts down unless reset, and when the countdown reaches zero, second stage heating is initiated. Events that cause reset of the second stage delay timer 42 include the absence of a call for first stage heat, the presence of a call for second stage heat; or the absence of a call for second stage heat, when the controller is connected to a multistage thermostat.

Figure 3:
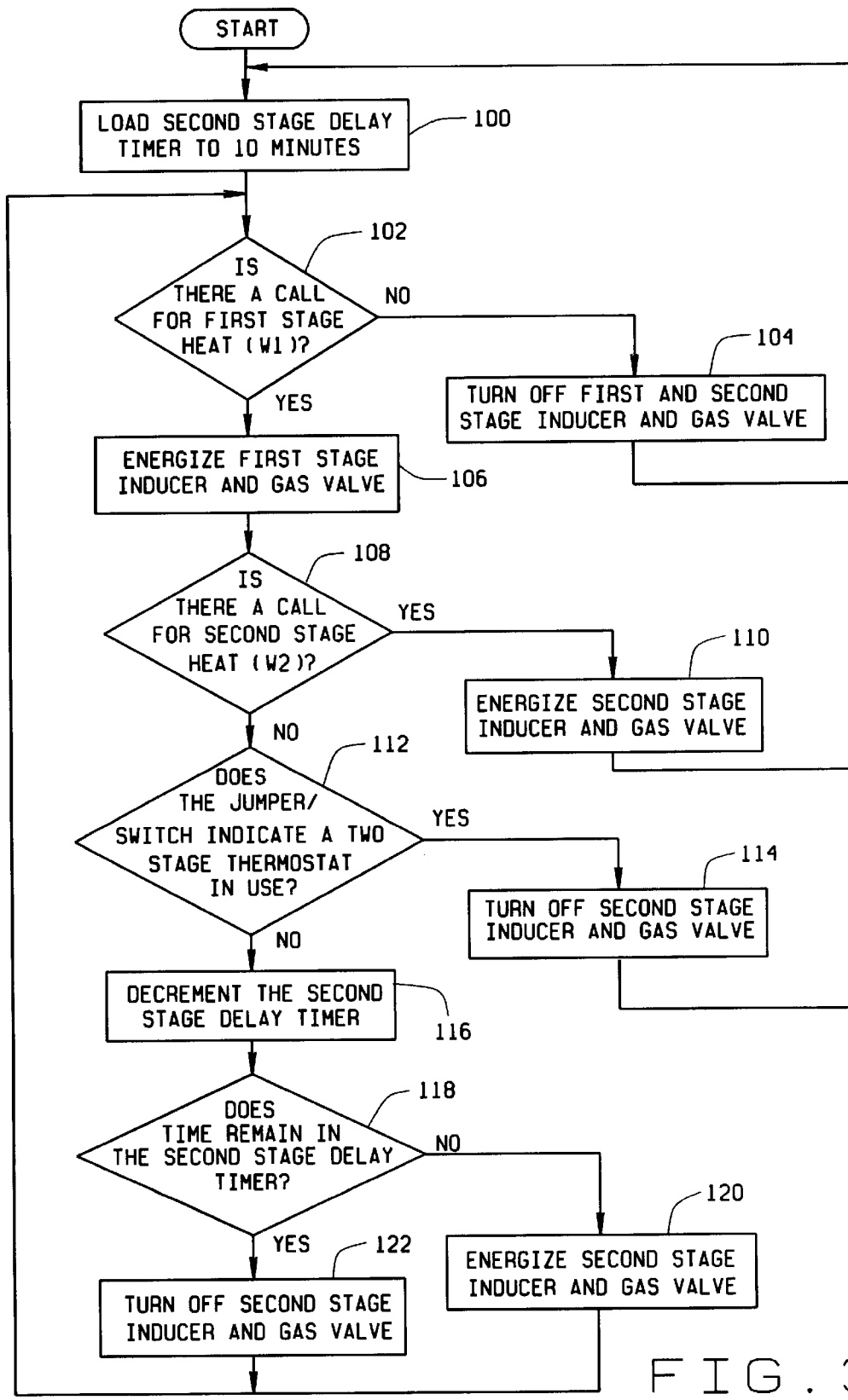
FIG. 3 is a flow chart of the logic implemented by the controller of a first embodiment.

The method implemented by a first embodiment of the controller 20, in which the type of thermostat connected to the controller is indicated with a jumper or switch, is shown schematically in FIG. 3. At 100 the controller sets the second stage delay timer 42 to ten minutes. At 102 the controller 20 determines whether there is a call for first stage heat. If there is no call for first stage heat, at 104 the controller 20 turns off the first stage inducer and gas valve and the second stage inducer and gas valve (if they are on) and returns to start, resetting the second stage delay timer 42 to ten minutes. If there is a call for first stage heat at 102, then at 106 the controller energizes first stage inducer and gas valve, and at 108 determines whether there is a call for second stage heating. If there is a call for second stage heating at 108, the controller 20 energizes the second stage inducer and gas valve at 110, and returns to start, resetting the second stage delay timer 42 to ten minutes. If there is not a call for second stage heating at 108, then at 112 the controller then determines what type of thermostat is connected to the controller 20. If the thermostat is a multistage thermostat, and there is no call for second stage heat, then at 114 the controller 20 turns off the second stage inducer and gas valve. If the thermostat is not a multistage thermostat, the second stage delay timer is decremented at 116. The controller then determines at 118 whether there is any time remaining in the second stage delay timer 42. If there is no time remaining on the second stage delay timer 42, then at 120 the controller energizes the second stage inducer and gas valve, and returns to 102 to check whether there is still a call for first stage heating, and repeats the cycle. If, at 118, the controller 20 determines that there is time remaining on the second stage delay timer 42 then at 122 the controller turns off the second stage heating, and returns to 102 to check whether there is still a call for first stage heating, and repeats the cycle.

The controller 20 can operate with either a single stage thermostat 22 or a multistage thermostat 24. In the case of a single stage thermostat 22, the thermostat is connected to the first terminal 26, and the controller 20 is set for operation with a single stage thermostat. In one embodiment the controller 20 is set by connecting the first and third contacts 32 and 36 on contact block 30 with jumper 38. In another embodiment the controller 20 is set by operating a switch to the single stage thermostat position. The controller 20 sets up the second stage delay timer 42 for ten minutes, and then checks for a demand for first stage heating on terminal 26. If there is no demand for first stage heating, the controller 20 returns to 100 where the second stage delay timer is reset to 10 minutes, and the cycle repeated. If there is a demand for first stage heating on terminal 26, then at 106 the controller 20 energizes the first stage inducer and gas valve. The controller then checks for a demand for second stage heating on terminal 28. There is, of course, no such demand, so the controller 20 then determines whether the controller is connected to a multistage thermostat. The jumper 38 or switch enables the controller 20 to determine that the controller is not connected to a multistage thermostat. At 116, the controller then decrements the second stage delay timer 42, and at 118 checks the timer. If no time is remaining on the second stage delay timer 42 the controller 20 energizes the second stage inducer and gas valve, and returns to 102. If there is still time remaining on the second stage delay timer 42, the controller turns off the second stage inducer and gas valve, and returns to 102.

Figure 4:
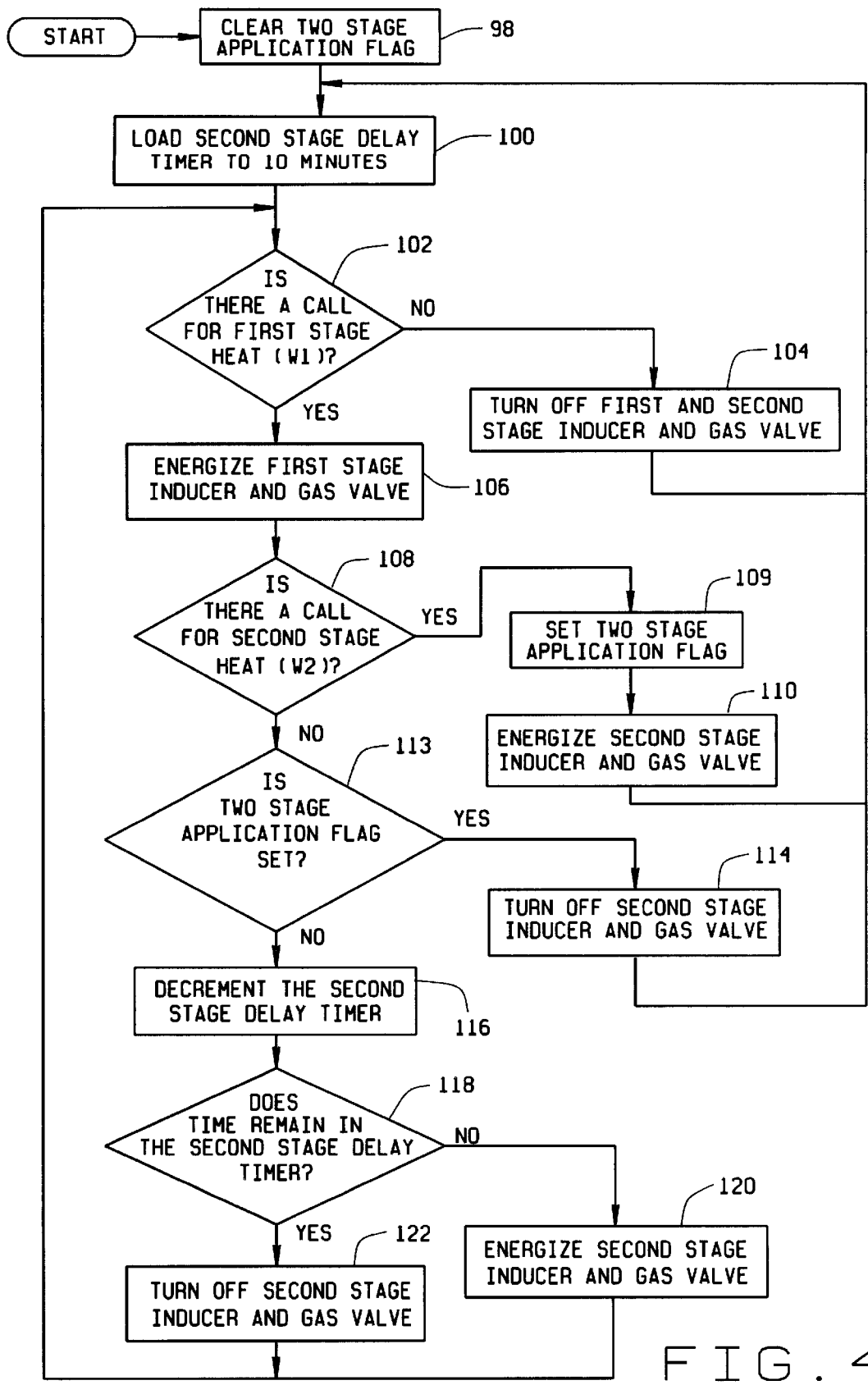
FIG. 4 is a flow chart of the logic implemented by the controller of a second embodiment.

The method implemented by a second embodiment of the controller 20, in which the controller is capable of "learning" the type of thermostat connected to the controller, is shown schematically in FIG. 4. In this embodiment the controller includes a two stage application flag which may be, for example, a memory location whose content is representative of the type of thermostat connected to the controller. At 98 the controller clears the two stage application flag. At 100 the controller sets the second stage delay timer 42 to ten minutes. At 102 the controller 20 determines whether there is a call for first stage heat. If there is no call for first state heat, at 104 the controller 20 turns off the first stage inducer and gas valve and the second stage inducer and gas valve (if they are on) and returns to 100, resetting the second stage delay timer 42 to ten minutes. If there is a call for first stage heat at 102, then at 106 the controller energizes first stage inducer and gas valve, and at 108 determines whether there is a call for second stage heating. If there is a call for second stage heating at 108, the controller 20 sets the two stage application flag at 109 (because the call for second stage heat unambiguously indicates that the controller is in fact connected to a multistage thermostat). The controller 20 then energizes the second stage inducer and gas valve at 110, and returns to 100, resetting the second stage delay timer 42 to ten minutes. If there is not a call for second stage heating at 108, then at 113 the controller then determines whether the two stage application flag has been set, indicating that the controller has determined that it is connected to a multistage thermostat. If the two stage application flag has been set, indicating that the thermostat is a multistage thermostat, and there is no call for second stage heat, then at 114 the controller 20 turns off the second stage inducer and gas valve. If the two stage application flag has not been set, indicating that the thermostat is not a multistage thermostat (or at least that the thermostat has not unambiguously been determined to be a multistage thermostat), the second stage delay timer is decremented at 116. The controller then determines at 118 whether there is any time remaining in the second stage delay timer 42. If there is no time remaining on the second stage delay timer 42, then at 120 the controller energizes the second stage inducer and gas valve, and returns to 102 to check whether there is still a call for first stage heating, and repeats the cycle. If, at 118, the controller 20 determines that there is time remaining on the second stage delay timer 42 then at 122 the controller turns off the second stage heating, and returns to 102 to check whether there is still a call for first stage heating, and repeats the cycle.

Operation

The controller 20 can operate with either a single stage thermostat 22 or a multistage thermostat 24. In the case of a single stage thermostat 22, the thermostat is connected to the first terminal 26. In the first embodiment the controller 20 is set for operation with a single stage thermostat. In one embodiment the controller 20 is set by connecting the first and third contacts 32 and 36 on contact block 30 with jumper 38 or by operating a switch to the single stage thermostat position. In the second embodiment, the controller has a two stage application flag that is reset at start up and indicates that the controller is not connected to a multistage thermostat. If the controller ever receives a call for second stage heating, it sets the two stage application flag. Thus, in effect, the controller 20 "assumes" it is connected to a single stage thermostat unless and until it receives a demand for second stage heating on terminal 28 (which never occurs with a single stage thermostat). The controller 20 sets the second stage delay timer 42 for ten minutes, and then checks for a demand for first stage heating on terminal 26. If there is no demand for first stage heating, the controller 20 returns to 100 where the second stage delay timer is reset to 10 minutes, and the cycle repeated. If there is a demand for first stage heating on terminal 26, then at 106 the controller 20 energizes the first stage inducer and gas valve. The controller then checks for a demand for second stage heating on terminal 28. There is no such demand, since the controller is connected to a single stage thermostat. The controller 20 then determines whether the two stage application flag has been set. Because the thermostat is a single stage thermostat, the two stage application flag is not set. At 116, the controller then decrements the second stage delay timer 42, and at 118 checks the timer. If no time is remaining on the second stage delay timer 42 the controller 20 energizes the second stage inducer and gas valve, and returns to 102. If there is still time remaining on the second stage delay timer 42, the controller turns off the second stage inducer and gas valve, and returns to 102.

Figure 1B:
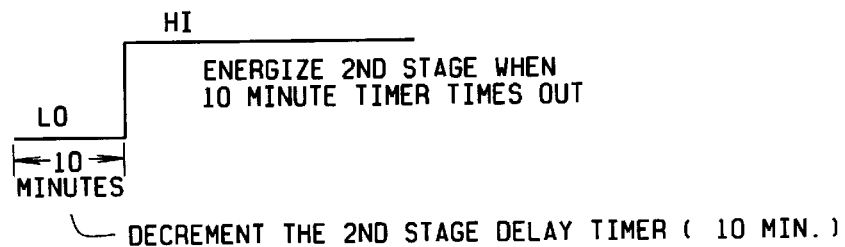
FIG. 1B is a timing diagram of the operation of the controller upon a demand for heating from a single stage thermostat.

FIG. 1B illustrates the operation of the controller when connected to a single stage thermostat. After a demand for heat the controller waits for ten minutes and if there is still a demand for heat the controller provides high heat.

In the case of a multistage thermostat 24, the thermostat is connected to the first and second terminals 26 and 28, and the controller 20 is set for operation with a multistage thermostat. The controller 20 of the first embodiment is set by connecting the first and second contacts 32 and 34 on the contact block 30 with a jumper 38, or by operating a switch to the multistage thermostat position. In the controller of the second embodiment, the controller "assumes" that it is connected to a single stage thermostat unless and until it receives a demand for second stage heating on terminal 28, which will occur the first time that second stage heating is demanded on terminal 28, and the controller "learns" that it is connected to a multistage thermostat. The controller 20 sets up the second stage delay timer 42 for ten minutes, and then at 102 checks for a demand for first stage heating on terminal 26. If there is no demand for first stage heating, the controller returns to 100 where the second stage delay timer is reset to 10 minutes, and the cycle repeated. If there is a demand for first stage heating on terminal 26 then at 106 the controller 20 energizes the first stage inducer and gas valve. The controller 20 then checks for a demand for second stage heating on terminal 28. If there is such a demand, the controller 20 energizes the second stage inducer at 110 and returns to 100. If there is no such demand, then the controller 20 determines whether the controller is connected to a multistage thermostat. The jumper 38 or switch enables the controller of the first embodiment to determine that the controller is connected to a multistage thermostat. The two stage application flag enables the controller of the second embodiment to determine that the controller is connected to a multistage thermostat. The controller 20 then turns off the second stage inducer and gas valve and returns to 100 resetting the second stage delay timer 42, and restarting the controller thermostat cycle. In the event that the controller 20 of the second embodiment does not yet know that it is connected to a multistage thermostat, the controller decrements the second stage delay timer 42, and checks the timer. If no time were remaining on the timer, the controller 20 would energize the second stage inducer and gas valve at 120, and return to 102. However, this is not likely with a multistage thermostat. The more likely situation, if this step is reached at all, is that time does remain. If there is still time remaining on the second stage delay timer 42, the controller 20 turns off the second stage inducer and gas valve, and returns to 102.

Figure 2B:
FIG. 2B; is a timing diagram of the operation of the controller upon first stage and second stage heating demands by the multistage thermostat.

FIG. 2B illustrates the operation of the controller when connected to a multi-stage thermostat. On initiation of a demand for low heat the controller provides low heat, and immediately upon a demand for high heat the controller provides high heat.

What is claimed is:

1. A method of controlling a two stage furnace comprising:

(a) initiating a second stage delay timer;

(b) determining whether there is a call for first stage heat from a thermostat, and if there is not returning to step (a), and if there is, actuating the first stage heating;

(c) determining whether there is call for second stage heat from the thermostat, and if there is actuating second stage heating and returning to step (a), and if there is not, determining whether the thermostat is a one stage or a two stage thermostat, and if the thermostat is determined to be a two stage thermostat deactivating second stage heating and returning to step (a), and if the thermostat is determined to be a one stage thermostat, decrementing the second stage delay timer; and (d) determining whether there is time remaining in the second stage delay timer, and if not, activating the second stage heating, and if so deactivating the second stage heating, and returning to step (a).

2. The method according to claim 1 wherein the step of determining whether the thermostat is a one stage or a two stage thermostat includes referring to a user-selected indicator.

3. The method according to claim 2 wherein the user-selected indicator is a jumper between two contacts.

4. The method according to claim 2 wherein the user-selected indicator is a switch.

5. The method according to claim 1 wherein the step of determining whether the thermostat is a one stage or a two stage thermostat includes referring to a detector which indicates that the thermostat is a one-stage thermostat until a request for second stage heating is detected by the detector.

6. The method according to claim 1 wherein the step of determining whether the thermostat is a one stage or a two stage thermostat comprises setting a flag when a call for second stage heating is made and checking the flag to determine whether the flag has been set.

7. A controller for a two-stage furnace, adapted for use with either a one stage or a two-stage thermostat, the controller implementing the following steps:

(a) initiating a second stage delay timer (b) determining whether there is a call for first stage heat from the thermostat, and if there is not, returning to step (a), and if there is actuating the first stage heating;

(c) determining whether there is call for second stage heat from the thermostat, and if there is, actuating second stage heating and returning to step (a), and if there is not determining whether the thermostat is a one stage or a two stage thermostat, and if the thermostat is determined to be a two stage thermostat deactivating second stage heating and returning to step (a), and if the thermostat is determined to be a one stage thermostat, decrementing the second stage delay timer; and (d) determining whether there is time remaining in the second stage delay timer, and if not, activating the second stage heating, and if so deactivating the second stage beating, and returning to step (a).

8. The controller according to claim 7 wherein the controller has a device for indicating whether the attached thermostat is a one stage or a two stage thermostat.

9. The controller according to claim 8 wherein the device for indicating whether the attached thermostat is a one stage or a two stage thermostat is a switch.

10. The controller according to claim 8 wherein the device for indicating whether the attached thermostat is a one stage or two stage thermostat is a shorting bar having three contacts, on which a jumper is connected to a first contact and a third contact to indicate a one stage thermostat, and a jumper is connected to a first contact and a second contact to indicate a two-stage thermostat.

11. The controller according to claim 7 wherein the device for indicating whether the attached thermostat is a one stage or a two stage thermostat is a flag that is set when the controller receives a call for second stage heating from the thermostat and which is referenced by the controller to determine whether the attached thermostat is a one stage or a two stage thermostat.

12. A controller for a two stage beat source, adapted to be connected to a one-stage or a two-stage thermostat, the controller comprising:

a first terminal for receiving a call for first stage heat from a one-stage or a two-stage thermostat connected to the first terminal;

a second terminal adapted for receiving a call for second stage heat from a two-stage thermostat connected to the second terminal;

an indicator for indicating whether a one-stage or two-stage thermostat is connected to the terminals; and a second stage delay timer which when decremented to zero actuates second stage heating from the heat source, the second stage delay timer being decremented until it is reset by detection of no call for first stage heat at the first terminal, a call for second stage heat at the second terminal; or no call for heat at the second terminal when the indicator indicates that the controller is connected to a two-stage thermostat.

13. A controller for a two stage heat source, adapted to be connected to a one-stage or a two-stage thermostat, the controller comprising:

a first terminal for receiving a call for first stage heat from a one-stage or a two-stage thermostat connected to the first terminal;

a second terminal adapted for receiving a call for second stage heat from a two-stage thermostat connected to the second terminal;

a detector for detecting whether the controller is connected to a one stage or a two stage thermostat, the detector determining that the controller is connected to a one-stage thermostat until the detector senses a call for second stage heat on the second terminal; and a second stage delay timer which when decremented to zero actuates second stage heating from the heat source, the second stage delay timer being decremented until it is reset by detection of no call for first stage heat at the first terminal, a call for second stage heat at the second terminal; or no call for heat at the second terminal when the indicator indicates that the controller is connected to a two-stage thermostat.

* * * * *